United States Patent [19]

Gamo et al.

[11] Patent Number: 4,946,646
[45] Date of Patent: Aug. 7, 1990

[54] ALLOY FOR HYDROGEN STORAGE ELECTRODES

[75] Inventors: Takaharu Gamo; Yoshio Moriwaki, both of Osaka; Tsutomu Iwaki, Kyoto, all of Japan

[73] Assignee: Matsushita Electric Industrial Co., Ltd., Osaka, Japan

[21] Appl. No.: 194,568

[22] Filed: May 16, 1988

[30] Foreign Application Priority Data

| May 15, 1987 | [JP] | Japan | 62-119411 |
| Jul. 30, 1987 | [JP] | Japan | 62-190698 |
| Aug. 19, 1987 | [JP] | Japan | 62-205683 |
| Aug. 31, 1987 | [JP] | Japan | 62-216898 |
| Oct. 14, 1987 | [JP] | Japan | 62-258889 |

[51] Int. Cl.$^5$ .......................... C22C 22/00; C01F 3/00
[52] U.S. Cl. .................................. 420/415; 29/623.1; 29/40; 420/580; 420/588; 420/900; 423/644; 429/209
[58] Field of Search ............... 420/900, 4.5, 580, 588, 420/422; 423/644; 429/181, 209, 218, 40–42; 29/623.1

[56] References Cited

U.S. PATENT DOCUMENTS

| 4,195,989 | 1/1980 | Gamo et al. | 75/175.5 |
| 4,228,145 | 10/1980 | Gamo et al. | 423/644 |
| 4,359,396 | 11/1982 | Maeland | 423/644 |
| 4,412,982 | 11/1983 | Wallace et al. | 423/644 |
| 4,551,400 | 11/1985 | Sapru et al. | 429/94 |
| 4,716,088 | 12/1987 | Reichman et al. | 429/101 |
| 4,728,586 | 3/1988 | Venkatesar | 429/94 |

FOREIGN PATENT DOCUMENTS

| 0035300 | 9/1981 | European Pat. Off. . |
| 2337437 | 7/1977 | France . |
| 5445608 | 4/1979 | Japan . |
| 0038440 | 4/1981 | Japan | 420/900 |
| 0024336 | 2/1985 | Japan | 420/900 |
| 60-119079 | 6/1985 | Japan . |
| 60-241652 | 11/1985 | Japan . |
| 61-64068 | 4/1986 | Japan . |
| 1571299 | 7/1980 | United Kingdom . |

OTHER PUBLICATIONS

Journal of the Less-Common Metals, vol. 131, 15th Mar. 1987, pp. 311–319, Elsevier Sequoia, NL; S. Wakao et al.: "Capacities and Durabilities of Ti–Zr–Ni Alloy Hydride Electrodes and Effects of Electroless Plating on their Performance".

Primary Examiner—Upendra Roy
Attorney, Agent, or Firm—Lowe, Price, LeBlanc, Becker & Shur

[57] ABSTRACT

A hydrogen storage electrode comprising a body of an alloy of the general formula, $AB_a$, or a hydride thereof, in which A represents at least one element selected from the group consisting of Zr, Ti, Hf, Ta, Y, Ca, Mg, La, Ce, Pr, Mm, Nb, Nd, Mo, Al and Si, B represents at least one element selected from Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm where Mm is a mixture of rare earth elements, Pr, Nd, Th and Sm provided that A and B are different from each other, and a is a value of from 1.0 to 2.5. The alloy has an alloy phase which is substantially a Laves phase of an intermetallic compound of A and B, and has a crystal structure of a hexegonally symmetric C14 type having crystal lattice constants, a and c, of from 4.8 to 5.2 angstroms and from 7.9 to 8.3 angstroms, respectively, and/or a cubically symmetric C15 type having a crystal lattice constant of from 6.92 to 7.70 angstroms. A method for making the electrode is also described using a sintering or non-sintering process.

18 Claims, 8 Drawing Sheets

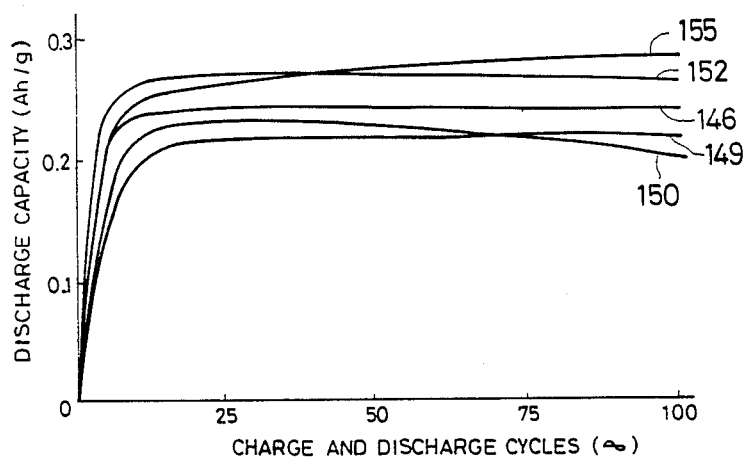
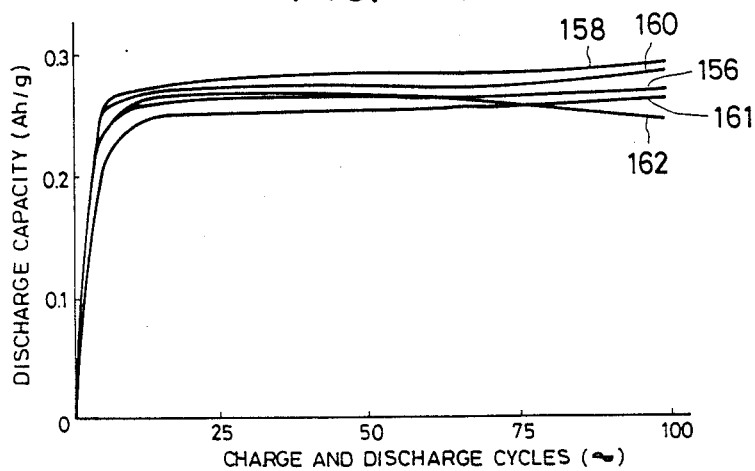

ALLOY FOR HYDROGEN STORAGE ELECTRODES

BACKGROUND OF THE INVENTION

1. Field of the Invention

This invention relates to secondary cells or batteries and more particularly, to hydrogen storage electrodes using hydrogen storage alloys or their hydrides capable of reversibly storing or absorbing and releasing hydrogen. The hydrogen storage electrodes can be utilized in alkaline batteries which are unlikely to produce public nuisance and have high energy densities.

2. Description of the Prior Art

Currently, lead acid storage batteries and alkaline storage batteries have been widely used as secondary batteries. Among the alkaline storage batteries, nickel-cadmium batteries are most widely employed. However, the recent development of portable appliances demands a secondary battery or cell of a higher energy density substantially free of any ecological problems.

Attempts have been made to use zinc as a negative electrode in place of cadmium. However, the cell using the zinc electrode has not been in wide use because of the problem of life cycle. Now, attention has been drawn to alkaline storage batteries using a hydrogen storage alloy capable of reversibly storing and releasing hydrogen as a negative electrode and a nickel oxide as a positive electrode. This battery may be called a nickel-hydrogen secondary battery. The hydrogen storage battery has a substantially dischargeable energy density higher than existing cadmium batteries and is free of any formation of dendrite as with Zn. In addition, the hydrogen storage battery can be fabricated by known methods. Accordingly, the hydrogen storage battery has been expected as a secondary battery which has a high energy density, long life cycle and low public nuisance.

Known hydrogen storage alloys useful as the hydrogen storage electrode include, for example, $Ti_2Ni$, $TiNi$, $LaNi_5$, $MnNi_5$, and $CaNi_5$ with or without other additive elements. These alloys are described, for example, in The Journal of Less-Common Metals 129 (1987), pp. 13–30 and 131 (1987), pp. 311–319. Moreover, U.S. Pat. Nos. 4,551,400 and 4,716,088 describe improved alloys of the formula, $Ti_{2-x}Zr_xV_{4-y}Ni_y$, in which $0 < x \leq 1.5$ and $0.6 \leq y \leq 3.5$.

Although $Ti_2Ni$, $TiNi$ and substituted alloys thereof have a relatively high dischargeable capacity in electrochemical charge and discharge cycles, a Ti-rich stable phase is formed after repetition of the charge and discharge cycles. This leads to a cycle life problem. On the other hand, $LaNi_5$, $MnNi_5$ and substituted alloys thereof are low in hydrogen storage capacity, so that the discharge capacity is relatively small. Moreover, this type of alloy has further disadvantages in that a variation in performance is great relative to the variation in temperature, the alloy is expensive, and the purities of starting metals are not necessarily satisfactory. Secondary batteries using $CaNi_5$ and substituted alloys thereof exhibit a high discharge capacity at an initial stage of the charge and discharge cycle, but considerably lower in performance, similar to those using $Ti_2N$ and $TiNi$, after repetition of the charge and discharge cycle.

The alloys of $Ti_{2-x}Zr_xV_{4-x}Ni_y$ gradually convert into more stable hydrides and, thus, an effective alloy phase reduces in amounts with a problem of the cycle life.

SUMMARY OF THE INVENTION

It is an object of the present invention to provide a hydrogen storage electrode which is adapted for use in secondary batteries whereby the battery has a high discharge capacity with a long life cycle and involves little ecological problem.

It is another object of the invention to provide a hydrogen storage electrode which is made of an alloy or its hydride whose alloy phase is substantially a Laves phase of an intermetallic compound.

It is a further object of the invention to provide a hydrogen storage electrode made of an alloy which is capable of storing or releasing a greater amount of hydrogen than known alloys and rarely forms a stable hydride or oxide phase, so that it can maintain a high energy density over a long term when the hydrogen-storing and releasing cycle is repeated.

It is a still further object of the invention to provide a method for making a hydrogen storage electrode of the type mentioned above.

Broadly, the hydrogen storage electrode according to the invention is made of a body which comprises an alloy of the following general formula, or its hydride, $$AB_a$$

in which A represents at least one element selected from the group consisting of Zr, Ti, Hf, Ta, Y, Ca, Mg, La, Ce, Pr, Mm, Nb, Nd, Mo, Al and Si, B represents at least one element selected from the group consisting of Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm, in which Mm is a Misch metal or a mixture of rare earth elements, provided that A and B are different from each other, and a is a value of from 1.0 to 2.5. The alloy or its hydride should have an alloy phase which is substantially a Laves phase of an intermetallic compound of A and B and should also have a crystal structure which is a hexagonally symmetric $MgZn_2$ or C14 type structure and/or a cubically symmetric $MgCu_2$ or C15 type structure. With the cubically symmetric MgZn or 15 type structure, the crystal lattice constant, a, should be from 6.92 to 7.70 angstroms. With the $MgCu_2$ type structure, the crystal lattice constants, a and c, should, respectively, in the ranges of from 4.8 to 5.2 angstroms and from 7.9 to 8.3 angstroms. With this and these ranges, a high discharge capacity is obtained. A is preferably Zr or a mixture of not less than 30 atomic percent of Zr and the balance of at least one member selected from the group consisting of Ti, Hf, Si and Al. More specific Zr-V-Ni or Zr-Mo-Ni alloys or hydrides, or Zr-V-Ni-M alloys in which M is other metal, are also preferred in the practice of the invention because these alloys exhibit an improved discharge capacity or life cycle. The hydrides of these alloys are similarly used. The hydrogen storage alloys or hydrides used in the present invention permit theoretically a larger number of hydrogen atoms per unit lattice than known alloys and can thus store or release a larger amount of hydrogen. This is advantageous in that when the storing and releasing cycle of hydrogen is repeated, more stable hydride and oxide phases are unlikely to form. Accordingly, a hydrogen storage electrode using the hydrogen storage alloy maintains a high energy density over a long term.

A method of fabricating the hydrogen storage alloy or hydride electrode as described above includes a non-sintering or sintering process. The non-sintering process comprises providing pieces or powder of the alloy or hydride, mixing the powder with a resin binder dissolved in a solvent and a conductive agent to obtain a dispersion or paste, applying the dispersion to a conductive core material, and drying the applied dispersion in a vacuum to obtain an electrode. Preferably, the conductive core material is a porous metal body, such as of Ni, having an average pore size of from 100 to 150 micrometers and a density of from 700 to 800 mg/cm$^3$ and is applied with the dispersion at a packing rage of 4.5 to 5.0 g/cm$^3$ in the dry basis. Alternatively, the sintering process may be used in which the powder of the alloy or hydride is mixed with a resin binder dissolved in a solvent and a sintering aid. The dispersion is applied to a conductive core material such a punching metal, dried in vacuum and press molded along with the conductive core material. The resultant molding is sintered in vacuum at a temperature of from 700° to 1200° C., during which the resin binder is thermally decomposed at approximately 400° C.

BRIEF DESCRIPTION OF THE DRAWINGS

FIGS. 12, 13 and 14 are, respectively, a graphical representation of a charge and discharge cycle life characteristic of hydrogen storage electrodes according to further embodiments of the invention.

DETAILED DESCRIPTION AND EMBODIMENTS OF THE INVENTION

Figure 1A:
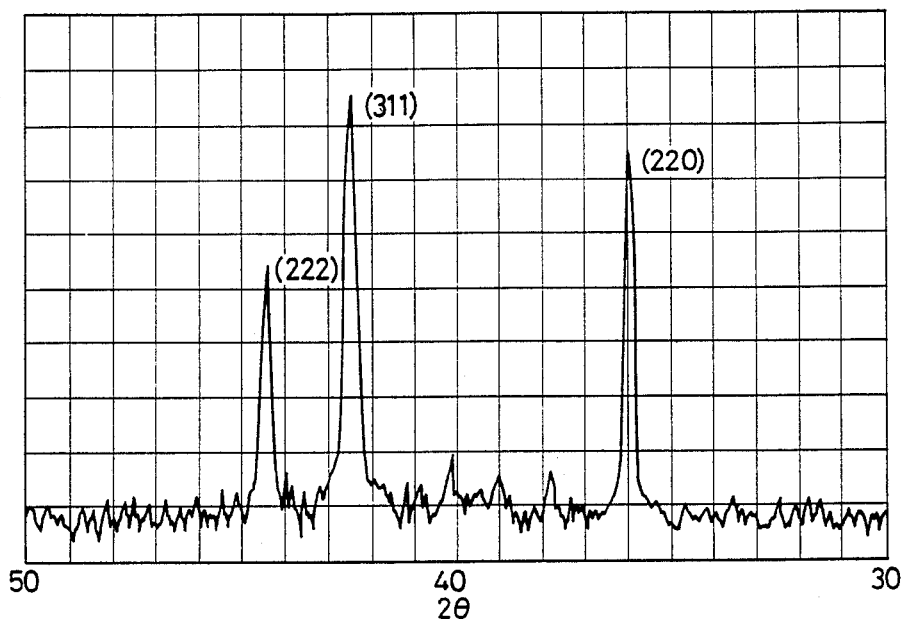
FIGS. 1A and 1B are, respectively, X-ray refraction patterns of hydrogen storage alloys used in the invention.

Broadly, the hydrogen storage electrode of the invention comprises a body of an alloy of the general formula, $AB_a$, in which A represents at least one element selected from Zr, Ti, Hf, Ta, Y, Ca, Mg, La, Ce, Pr, Mm, Nb, Nd, Mo, Al and Si, B represents at least one element selected from Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm where Mm is a mixture of rare earth elements, Pr, Nd, Th and Sm provided that A and B are different from each other, and a is a value of from 1.0 to 2.5. In this broad aspect, "a" is defined to be in the range of from 1.0 to 2.5, but with more specific combinations of the elements defined above, the value of a may be in a wider range provided that such combinations are able to form a defined alloy phase. The alloy useful in the present invention should have an alloy phase which is substantially a Laves phase of an intermetallic compound of A and B, and should have a crystal structure of a hexagonally symmetric $MgZn_2$ or C14 type and/or face-centered cubically symmetric $MgCu_2$ or C15 type. It will be noted that Mm defined as a mixture of rare earth elements may be so-called Misch metal.

In general, $AB_a$ alloys, in which A and B have the meaning as defined above, may have alloy phases other than the Laves phase of the C14 and/or C15 type, depending upon the combination of metal elements and the manner of preparation of the alloy. The alloys of the $AB_a$ type may take various structures of from C to C54 types defined according to the Structturberichte classification. For instance, $MoSi_2$ will be likely to have a structure of the C11$b$ type $CaAl_2$ will take a C54 type structure, and $TiSi_2$ will take a C54 type structure. These structures are mainly dependent upon the types of constituent elements and also on the manner or conditions of preparation of the alloys. In the practice of the invention, the alloys having structures other than the C14 and/or C15 type structure will not be effective as a hydrogen storage electrode. Moreover, it has been experimentally confirmed that the crystal lattice constants a and b of the C14 type structure should, respectively, values of from 4.8 to 5.2 angstroms and from 7.9 to 8.3 angstroms. With the C15 type structure, the crystal lattice constant, a, should be in the range of from 6.92 to 7.70 angstroms. Within this or these ranges of the constants, good discharge capacity and charged or discharged ampere-hour characteristics are obtained. The hydrogen storage alloys having the Laves phase having appropriate lattice constant or constants have theoretically greater capability of occupying hydrogen atoms per unit lattice than known alloys. This allows a greater amount of either storing or releasing hydrogen. In addition, the alloys rarely form stable, not reversible, hydride or oxide phases when a storing and releasing cycle of hydrogen is repeated. This is why the electrode using the alloy of the invention can maintain a high energy density over a long term.

Through a number of experiments of alloys as defined in the formula indicated above, it has been found that when the alloy has the C14 type Laves phase or the C15 type Laves phase, such an alloy is effective as a hydrogen storage electrode provided that the crystal lattice constant or constants are in the defined range or ranges.

The cubically symmetric C15 type Laves phase alloy has a $MgCu_2$ type crystal structure. The performance of the C15-type alloy as a hydrogen storage material is greatly influenced by the crystal lattice constant as stated above. However, when an alloy having good characteristics in a hydrogen gas phase is used as a hydrogen storage electrode, good results cannot always be obtained. This is because the electrochemical stability of the alloy in an alkaline electrolytic solution is important. It is general that alloys having a satisfactorily high charged and discharged ampere-hour characteristic are small in discharged ampere-hour. We have found that specific alloy compositions of the C14 type structure and the C15 type structure in which the crystal lattice constant or constants are within a certain range or ranges as set forth before are only useful as a hydrogen storage electrode.

All the alloys defined by the formula, $AB_a$, in which A, B and a have, respectively, the same meanings as defined before, are not suitable as hydrogen storage electrode. These alloys should have the C14 structure having a crystal lattice constants a and c of from 4.8 to 5.2 angstroms and from 7.9 to 8.3 angstroms, respectively, and/or the C15 structure having a crystal lattice constant, a, from 6.92 to 7.70 angstroms. The crystal structure is dependent greatly on the combination of elements used although the manner and conditions of preparation including a cooling speed, an annealing temperature and the like will, more or less, influence the formation of the structure. Other alloy phases such as of the types C11$b$, C12, C16 and C 23 may develop from combinations of A and B in the formula. These alloys of the different alloy phases are outside the scope of the invention.

Typical examples of binary alloys having the C14 type structure are $ZrMn_2$, $TiMn_2$, $ZnCr_2$ and the like, and those having the C15 type structure are $TiCr_2$, $ZrCo_2$, $ZrMo_2$ and the like. These type structures will develop when an alloy melt is cooled relatively slowly. If the melt is quenched, crystallization may not occur, or other phases may appear predominantly.

Figure 1B:
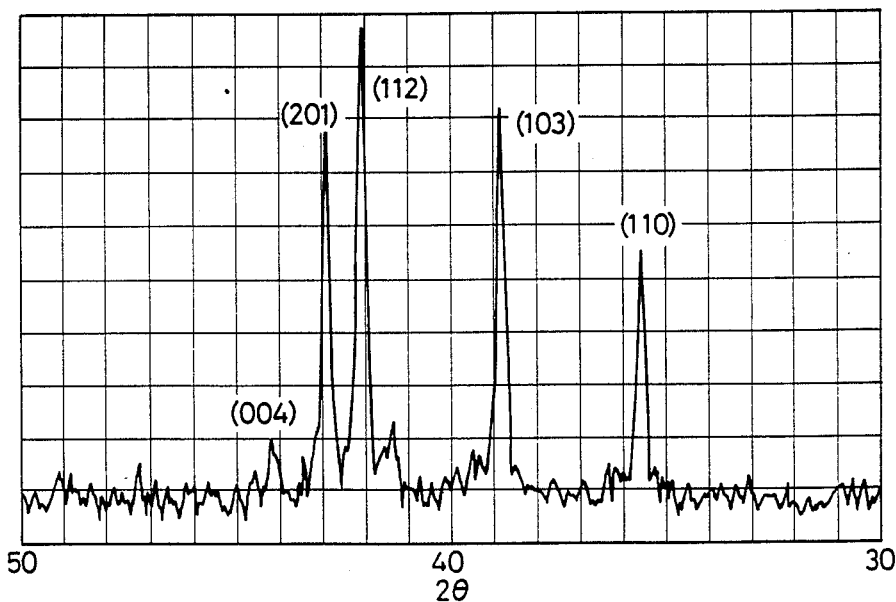

The crystal structure of the alloys is readily confirmed, for example, through X-ray diffraction analysis. Typical X-ray diffraction patterns of the C15-type Laves phase of $ZrMn_{0.6}Cr_{0.2}Ni_{1.2}$ and the C14-type Laves phase of $ZrMn_{0.6}Cr_{0.2}Al_{0.2}Ni_{1.0}$ are shown in FIGS. 1A and 1B, respectively. The numerals in the figures, e.g. (311), indicate Miller Indices. The formation of the C15-type Laves phase will be seen from the existence of peaks corresponding to the Miller indices (222), (311) and (220) in FIG. 1A. Likewise, the peaks corresponding to the Miller indices (004), (201) (112), (103) and (110) ensure the formation of the C14-type Laves phase. In this manner, the crystal structure of prepared alloys can be readily confirmed through the X-ray diffraction analysis. The existence of other peaks will show the development of other phases.

As stated above, the formation of the C14 type and/or C15 type Laves phase depends mainly upon the combination of elements, and also upon the manner or conditions of preparation of alloy. In some cases, the C14 and C15 structures appear in one alloy, and such an alloy is usable in the practice of the invention. It is not necessary that alloys of the invention be completely composed of the C14 and/or C15-type phase structure, but other phases may be contained only in small amounts, e.g. up to 10% of the total phases.

In the foregoing general formula, it is preferred that A is Zr or a mixture of at least 30 atomic percent of Zr and the balance of at least one element selected from Ti, Hf, Al and Si. This is because Zr contributes to increase an amount of storage of hydrogen, and tends to form a desired phase structure of the C15 types. Moreover, B is preferably a mixture of at least 40 atomic percent of Ni and the balance of at least one element selected from V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm.

In view of economy and characteristic properties, Ni, V, Zr, Cr, Mn and/or Mo is preferably contained in the alloy provided that the phase structure should be as defined before.

Although the alloys are described above, the electrochemically reversible hydrides of these alloys which have the C14 and/or C15-type structure may also be used in the practice of the invention. These hydrides are advantageous in preventing oxidation of alloy powder before fabrication of an electrode and exhibit a higher initial charge and discharge speed.

Of the alloys of the general formula, $AB_a$, in which A, B and a have, respectively, the same meanings as defined before, more specific Zr alloys have advantages in view of the fact that Zr is likely to form homogeneous alloys which are longer in cycle life and higher in capacity when applied as a negative electrode for hydrogen storage battery. Several preferred types of Zr alloys are described.

One such class is an alloy of the general formula, $ZrV_bNi_c$, in which $b=0.01$ to 1.20 and $c=1.0$ to 2.5. As will be seen from the above formula, this type of alloy is slightly different from the alloy of the formula, $AB_a$, in which a is in the range of from 1.0 to 2.5. With the Zr-V-Ni alloy, the value corresponding to "a" is in the range of 1.01 to 3.70. In this specific alloy, a wider range by atomic ratio of the B elements may be used. As will become apparent from examples appearing hereinafter, preferable ranges of b and c are, respectively, from 0.1 to 0.6 and from 1.4 to 1.9, within which a discharged ampere-hour at the 10th cycle is 350 mAh/g or higher.

The Zr-V-Ni alloys have generally a long cycle life and are good in economy. The reason for the long cycle life is considered as follows: the alloys have good electrochemical catalytic activity and a good oxidation resistance.

If the content of V is smaller than 0.01 or larger than 1.20, a discharge capacity becomes small. When the content of Ni is smaller than 1.0 or larger than 2.5, the resultant alloy has a small discharge capacity. The vanadium relates to a charged ampere-hour. A larger content of V results in a larger charged ampere-hour but also in a reduced discharge efficiency because of the formation of a stable hydride. Nickel takes part in a charge and discharge cycle characteristic or durability and a larger amount results in a longer life with an attendant tendency toward a smaller charged ampere-hour.

Another class is an alloy of the general formula, $ZrMo_dNi_e$, in which $d=0.1$ to 1.20 and $e=1.1$ to 2.5. This alloy is different from the alloy of the first class in which vanadium is replaced by Mo. Mo takes part in a charged ampere-hour characteristic similar to V. In this specific case, the ratio of B and A elements is wider than in the case of $AB_a$, i.e. $(Mo+Ni)/Zr=1.2$ to 3.70 provided that Mo is taken as the B element. In this alloy, preferred ranges of d and e are, respectively, from 0.3 to 0.7 and from 1.4 to 1.9. This alloy is also economically advantageous.

A further class includes an alloy of the general formula, $Zr_fV_gNi_hM_i$, in which f, g, h and i are atomic ratios of Zr, V, Ni and M and are $f=0.5$ to 1.5, $g=0.01$ to 1.2, $h=0.4$ to 2.5 and $i=0.01$ to 1.8 provided that $g+h+i=1.2$ to 3.7 and $(g+h+i)/f=1.0$ to 2.5, and M is at least one element selected from Mg, Ca, Y, Hf, Nb, Ta, Cr, Mo, W, Mn, Fe, Co, Pd, Cu, Ag, Au, Zn, Cd, Al, Si, In, Sn, Bi, La, Ce, Mm, Pr, Nd, Th and Sm.

When the content of V is smaller than 0.01 or larger than 1.2, the discharge capacity becomes small. Similarly, when the content of M is smaller than 0.01 or larger than 1.8, the resultant alloy exhibits a small discharge capacity when applied as a hydrogen storage electrode. Moreover, when the content of Zr is smaller than 0.5, a charge capacity becomes insufficient. Over 1.5, the discharge capacity becomes small. When the nickel content is smaller than 0.4, the cycle life is shortened, whereas over 2.5, the charge capacity becomes small. If the total of $(g+h+i)$ is smaller than 1.2, the resultant alloy is small in discharge capacity. Over 3.7, the charge capacity becomes smaller. When $(g+h+i)/f$ is outside the range of 1.0 to 2.5, the discharge capacity becomes small.

Zr and V take part in a charged ampere-hour characteristic. Larger contents of Zr and V lead to a larger charged ampere-hour characteristic but such elements are liable to from a stable hydride, resulting in a smaller discharge rate. The effect of Ni is as discussed in the afore-described classes. The content of M influences a charge and discharge cycle characteristic and a charge potential. A larger content of M can more improve these characteristics, but results in a more reduced charged ampere-hour characteristic.

In view of the discharge ampere-hour characteristic, it is preferred that the contents of V and M are, respectively, from 0.2 to 0.7 and 0.2 to 0.8.

A still further class relates to an alloy of the general formula $A'B'_jNi_k$, in which A' represents Zr or a mixture of at least 30 atomic percent of Zr and the balance of at least one element selected from Ti, Hf, Al and Si, B' represents at least one element selected from V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm in which Mm has the same meaning as defined before, j=0.5 to 1.0 and k=1.0 to 1.5 provided that j+k=1.0 to 2.5. The alloys of this class have a discharge capacity of from 200 to 350 mAh/g when used as a hydrogen storage electrode over a long cycle life and has thus good durability. In this sense, the alloys are preferred.

If A' is a mixture of Zr and other elements, it is preferred that Al and/or Si is used as the other element particularly in view of economy. Al or Si is used as a substitute for part of Zr, the strong chemical activities of Zr-based alloys such as ignitable properties can be mitigated. Accordingly, easy handling is allowed. Preferably, B' represents two or more elements selected from Cr, Mn, Fe and Co because better discharge cycle properties are obtained with good affinity for Ni and good homogeneity without causing segregation.

In view of the ease in formation of the C14 or C15-type Laves phase, preferable Zr-based alloys are those alloys of the general formula, $ZrMn_nCr_oNi_p$, in which n=0.4 to 0.8, o=0.1 to 0.4, and p=0.5 to 1.5 provided that n+o+p=1.0 to 2.5.

In these classes of the alloys, they should have a C14 or C15-type structure, in which the crystal lattice constant or constants should be in the range or ranges defined before.

For the preparation of the hydrogen storage alloys used in accordance with the present invention, commercially available metal pieces of a granular or plate form are provided and weighed in predetermined amounts, and these pieces are melted by argon arc melting or high frequency induction heating in vacuum or an inert gas such as argon.

In order to improve the homogeneity and crystallinity of the alloy, once prepared alloys are preferably thermally treated at temperatures lower than a melting point of the alloy in vacuum, an inert gas or air. The treating temperatures below the melting point should preferably be higher than 900° C., although varying depending upon the type of alloy, for ensuring the effect of the thermal treatment. The alloys indicated with reference to FIGS. 1A and 1B are thermally treated at 1080° C. The thermal treatment is generally effected for a time of at least one hour.

When Fe and V are used in combination to make a hydrogen storage alloy, these elements may be separately added as pieces. It is preferred that ferrovanadium is used as a starting material for Fe and V. This is because when ferrovanadium is used, the resultant alloy has very good homogeneity irrespective of other elements and is better than an alloy using Fe and V as separate pieces with respect to the performance as a negative electrode for alkaline battery. In addition, cost reduction is great. More particularly, when an alloy of the formula, $AB''_a$, in which A and a has the same meanings as defined before, respectively, and B represents Fe and V, or a mixture of Fe, V and at least one element selected from Ni, Cr, Mn, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm, is prepared, ferrovanadium is preferably used.

For the fabrication of a hydrogen storage electrode using the hydrogen storage alloys, it is usual to first divide the alloy into pieces having, for example, a size of from 150 to 500 U.S. mesh. The alloy can be divided into pieces by known techniques using the Ellis motor, a jaw crusher, an automatic mortar by a wet process. In general, binary Zr-Ni alloys are relatively difficult to pulverize, but ternary or quaternary alloys are more likely to pulverize.

In a sintering process, the pieces are subsequently mixed with from 2 to 10 wt % of a sintering aid based on the weight of the alloy pieces. The sintering aid is a powder of nickel or carbonyl nickel. The mixture is dispersed in a solution of a binder resin to obtain a paste or dispersion. The dispersion is applied to a conductive core material, dried in vacuum and press molded. The press molding is finally sintered in vacuum at a temperature of from 700° to 1200° C. for a time sufficient for the sintering, say, 1 hour or over. During the sintering, the resin binder is thermally decomposed at approximately 400° C. The resin binder may be hydrophilic or hydrophobic in nature and is, for example, polyethylene, polyvinyl alcohol, CMC, fluorine resins, synthetic rubbers such as styrene-butadiene rubber, thermoplastic elastomers such as tetrafluoroethylenehexafluoropropylene copolymers, and the like.

On the other hand, the electrode may be fabricated by a non-sintering process in which the alloy pieces are mixed with a solution of a resin binder as used in the sintering process along with a conductive agent, to obtain a paste or dispersion. The paste is applied to a conductive core material of a porous structure having a pore size of from 100 to 150 micrometers and a density of from 700 to 800 mg/cm³ at an appropriate packing rate, e.g. from 4.5 to 5.0 g/cm³ on the dry basis. The packed paste is dried in vacuum to obtain an electrode. The drying temperature may be not lower than 80° C., preferably about 120° C.

The conductive agent used in the non-sintering process may be metal pieces such as Cu, Ni and the like, carbonyl nickel powder, carbon, and the like. The agent is used in the amount of from 0.1 to 60 wt % of the alloy pieces.

In both sintering and non-sintering processes, the resin binders are dissolved in suitable solvents including water, alcohols such as ethyl alcohol, glycols such as ethylene glycol, and other organic solvents. Preferably, aqueous solutions of CMC, polyvinyl alcohol and the like having several weight percent are used. The conductive core materials may be a metal mesh a punching metal sheet, foamed metals, expanded metals, metallic fibers or felts, and the like as is ordinarily used for this purpose.

For the sintering process, a punching metal or a metal mesh is preferably used. On the other hand, foamed or expanded metals, and metallic fibers or felts are preferred for the non-sintering process.

The fabrication of the electrode from alloy pieces has been described above. The alloy pieces may be absorbed with hydrogen to form an electrochemically reversible hydride. The hydride is advantageous in preventing oxidation of the alloy. The electrochemically stable hydride is different from a non-reversible, stable hydride phase which might be present in the alloys of the invention in small amountes as a kind of solid solution. The use of a hydride as a starting material instead of a hydrogen storage alloy is also within the scope of the invention. It should be noted that when hydrogen storage alloys of the invention are absorbed with hydrogen, a stable hydride phase is invariably formed in the alloy in an amount of about 3 to 7 wt % of the alloy, but the alloys of the invention do not form a higher amount of the stable hydride during the charge-discharge cycle.

The electrode may take any form such as a disk, an elongated strip, a sheet, a plate or the like.

The present invention is more particularly described by way of examples.

EXAMPLE 1

Commercially available metal elements including Zr, Ti, Hf, Ta, Y, Ca, Mg, La, Ce, Mm (Misch metal), Nb, Nd, Sm, Mo, Al, Si, V, Cr, Mn, Fe, Co, Ni, Cu, Zn, Si, W and Cd were provided as starting elements and were weighed to give alloy compositions indicated in Table 1. The respective mixtures were molten in an argon arc melting furnace or in a high frequency induction heating furnace in vacuum or in an inert gas such as argon to obtain alloys indicated in Table 1.

Part of the respective alloy samples were used for analyses of an alloy composition, crystal structure, crystal lattice constant and homogeneity. The other samples were, respectively, used for the measurement of an amount of stored hydrogen in a hydrogen gas (mainly by a P (pressure)-C (composition)-T (temperature) procedure) and also for evaluation of electrode performance by a single electrode test and a sealed cell test.

Th P-C-T measurement procedure was effected by placing a sample alloy in a stainless steel reaction container and maintained at a given temperature. The air in the container was evacuated, into which an $H_2$ gas was introduced to a predetermined level inherent to the sample alloy. The hydrogen gas gradually absorbed as H into the alloy and the absorbing reaction stopped upon arrival at a given equilibrium pressure. The PCT curve at the temperature could be obtained by plotting a logarithm of the variation in pressure as y-axis and the amount of H as x-axis.

Part of the tested alloy samples is shown in Table 1 with respect to the alloy composition, crystal lattice constant and discharge capacity.

TABLE 1

| Sample No. | Alloy Composition | Crystal Lattice Constant (angstroms) | Discharge Capacity (mAh/g) |
|---|---|---|---|
| 1 | TiCo | 6.700 | 5 |
| 2 | $NbCo_2$ | 6.755 | 11 |
| 3 | $TaCo_2$ | 6.757 | 9 |
| 4 | TaFeNi | 6.855 | 17 |
| 5 | $CaAl_2$ | 8.038 | 89 |
| 6 | $LaAl_2$ | 8.170 | 29 |
| 7 | $CeAl_2$ | 8.055 | 73 |
| 8 | $ZrMo_2$ | 7.593 | 313 |

TABLE 1-continued

| Sample No. | Alloy Composition | Crystal Lattice Constant (angstroms) | Discharge Capacity (mAh/g) |
|---|---|---|---|
| 9 | $Ti_{0.5}Zr_{0.5}Mo_2$ | 7.449 | 338 |
| 10 | $Zr_{0.8}Mg_{0.2}V_2$ | 7.440 | 373 |
| 11 | $HfV_{1.8}Al_{0.2}$ | 7.386 | 378 |
| 12 | $Zr_{0.7}Nd_{0.3}Cr_2$ | 7.207 | 354 |
| 13 | $Ti_{0.8}Nb_{0.2}Cr_2$ | 6.943 | 270 |
| 14 | $Zr_{0.8}Ta_{0.2}Fe_2$ | 6.961 | 277 |
| 15 | $Zr_{0.6}Ce_{0.4}Fe_2$ | 7.172 | 321 |
| 16 | $La_{0.7}Y_{0.3}Co_2$ | 7.012 | 306 |
| 17 | $Ce_{0.2}Hf_{0.8}Co_2$ | 6.982 | 252 |
| 18 | $CeNi_{1.2}V_{0.8}$ | 7.102 | 339 |
| 19 | $MmCo_{1.5}Ni_{0.5}$ | 7.218 | 354 |
| 20 | $ZrV_{0.5}Ni_{1.5}$ | 7.340 | 365 |
| 21 | $Ti_{0.8}Mo_{0.2}Cr_2$ | 6.988 | 299 |
| 22 | $ZrCr_{1.25}V_{0.75}$ | 7.273 | 353 |
| 23 | $Ti_{0.4}Zr_{0.6}W_2$ | 7.350 | 361 |
| 24 | $ZrCr_{0.5}Fe_{1.5}$ | 7.150 | 347 |
| 25 | $Zr_{0.8}Nd_{0.3}Ni_{1.3}W_{0.4}$ | 7.581 | 310 |
| 26 | $Zr_{0.1}Mg_{0.8}Zn_{1.2}Cu_{0.8}$ | 7.246 | 362 |
| 27 | $Ti_{0.8}Zr_{0.2}Cr_{1.2}V_{0.8}$ | 7.230 | 350 |
| 28 | $Ti_{0.6}Zr_{0.4}Cr_{1.5}W_{0.5}$ | 7.432 | 356 |
| 29 | $Ti_{0.8}Zr_{0.2}Cr_{1.0}Co_{1.0}$ | 7.058 | 304 |
| 30 | $Ti_{0.2}Zr_{0.8}Cr_{0.5}Co_{1.5}$ | 6.955 | 270 |
| 31 | $Ti_{0.7}Zr_{0.3}Cr_{1.5}Ni_{0.5}$ | 7.422 | 367 |
| 32 | $Ti_{0.7}Zr_{0.3}Cr_{1.5}Fe_{0.5}$ | 7.034 | 302 |

The X-ray diffraction analysis of these alloys reveals that all the alloys indicated in Table 1 have the Laves phase of the C14 or C15 type. More particularly, the alloy Nos. 1 to 4 have the C15 type structure but the crystal lattice constant is smaller than 6.92 angstroms. The alloy Nos. 5 to 7 has a crystal lattice constant larger than 7.70 angstroms. In view of the above results, the crystal lattice constant should be in the range of from 6.92 to 7.70 angstroms. The alloy Nos. 8 to 32 were found to be better with respect to the amount of stored hydrogen when determined by the P-C-T measurement. The alloy Nos. 18 to 20, 25 and 31 are typical alloys containing Ni, and the alloy Nos. 8, 9 and 21 are typical alloys containing Mo.

These alloy samples were subjected to a cell test to evaluate the performance as a negative electrode for alkaline storage battery.

The test was effected as follows. Each alloy obtained by melting was pulverized to obtain particles having a size of 200 mesh or below (U.S. mesh). About 5 g of the alloy powder was sufficiently mixed with 0.5 g of a polyethylene powder as a binder and 2 g of a carbonyl nickel powder used as a conducting agent. The mixture was applied to a nickel mesh conductive core material having a wire diameter of 0.2 mm and a size of 16 mesh and pressed to obtain a plate. The plate was allowed to stand at 120° C. for about 1 hour in vacuum to melt the polyethylene, followed by attachment of lead wires to obtain a hydrogen storage electrode.

Figure 2:
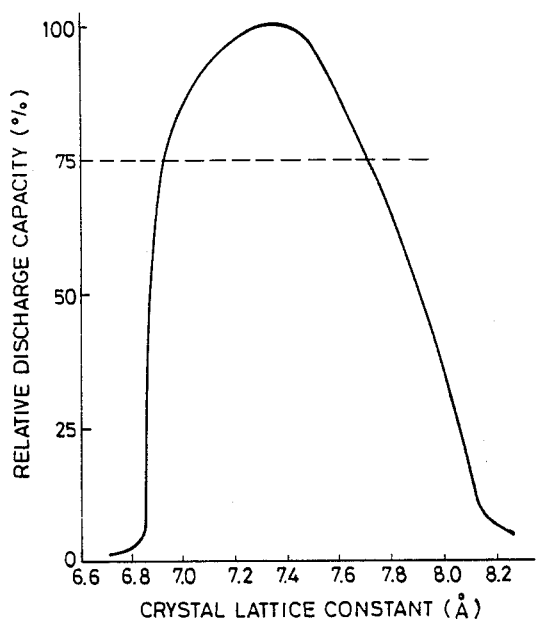
FIG. 2 is a curve of a relative discharge capacity in relation to the variation in crystal lattice constant.
Figure 3:
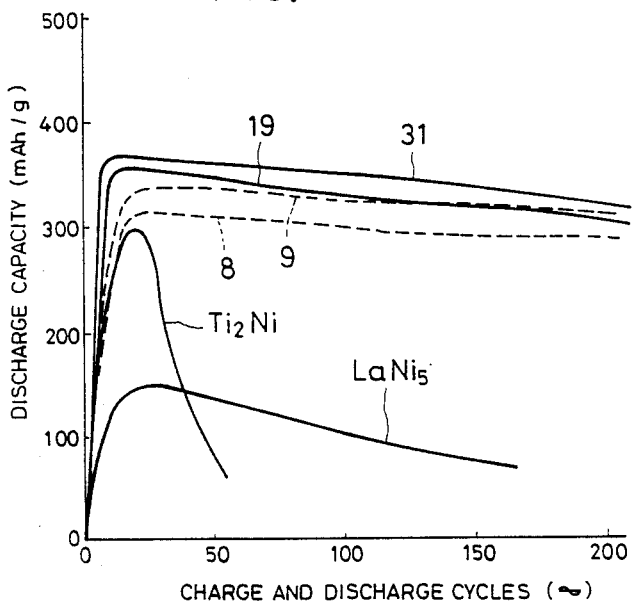
FIG. 3 is a graphical representation of a discharge capacity in relation to the variation in charge and discharge cycle for different hydrogen storage electrodes using alloys according to one embodiment of the invention and for comparison.

For evaluation of the electrode as a negative electrode for secondary cell, a sintered nickel electrode or plate which is used in a commercial nickel-cadmium battery was provided as a positive or counter electrode in such a way that the quantity of the positive electrode was in excess in electric capacity over that of the hydrogen storage alloy electrode. A polyamide non-woven fabric was used as a separator and a solution obtained by adding 20 g/liter of lithium hydroxide to a caustic soda aqueous solution having a specific gravity of 1.30 was used as an electrolyte. Subsequently, a charging and discharging cycle at a constant current was repeated at 20° C. The charged ampere-hour was 500 mA × 5 hours and the discharge was effected at 300 mA while cutting 0.8 volts or below. The discharge capacity is shown in Table 1. FIG. 2 shows the relationship between a relative discharge capacity and the crystal lattice constant, in which the relative discharge capacity is a value by percent relative to the maximum discharge capacity. In FIG. 3, there is shown a discharge capacity in relation to the variation in cycle number for the electrodes using the alloy sample Nos. 8,9,19 and 31 and the electrodes for comparison using LaNi$_5$ and Ti$_2$Ni.

As will be apparent from the results of the Table 1 and FIG. 2, the alloys of the invention having the elements defined in the present invention and the C14 or C15 type Laves phase are excellent as a negative electrode for alkaline storagae battery.

The alloy sample Nos. 1 to 4 which have the C15 type Laves phase but have a crystal lattice constant not larger than 6.92 angstroms are small in discharge capacity. On the other hand, the alloys having a crystal lattice constant larger than 7.70 angstrom is also small in discharge capacity. This is because the former alloys have the capability of storing only a small amount of hydrogen during a charging process or cycle. The latter alloys have the capability of storing a large amount of hydrogen, but form a stable hydride during the charge and discharge cycle, so that hydrogen cannot be released readily. Thus, the discharge efficiency is small. From the practical point of view, it may be preferred that the discharge capacity of a cell is not less than approximately 250 mAh/g. This value is 75% or higher of the maximum discharge capacity of the electrodes using the alloys of the invention.

As will become apparent from the cycle life characteristic of FIG. 3, the known electrodes using Ti$_2$Ni and LaNi$_5$ deteriorate considerably, whereas the hydrogen storage electrodes of the invention are better. Particularly, those alloys containing Ni, Mo or V are preferred.

It was also found that the electrodes of the invention had highly rapid charging and discharging characteristics. This is considered due to the fact that the alloys used in the present invention have good electrochemical catalytic activity and a good oxidation resistance.

In this example, the alloys of the AB$_a$, in which a=2, were shown. It should be noted that so far as intermetallic compounds of AB$_2$ are formed, the value of a is not necessarily at 2 but within a range of from 1.0 to 2.5.

EXAMPLE 2

This example illustrates a more specific alloy of the general formula, ZrV$_b$Ni$_c$, in which b=0.01 to 1.20 and c=1.0 to 2.5. The alloys of this type were prepared similar to Example 1. The compositions of some prepared alloys are indicated in Table 2.

TABLE 2

| Alloy No. | Alloy Composition | Discharged Ampere-Hour After 10 Cycles (mAh/g) |
|---|---|---|
| 33 | ZrV$_{1.0}$Ni$_{1.5}$ | 268 |
| 34 | ZrV$_{0.65}$Ni$_{1.8}$ | 348 |
| 35 | ZrV$_{0.6}$Ni$_{1.9}$ | 376 |
| 36 | ZrV$_{0.5}$Ni$_{1.4}$ | 365 |
| 37 | ZrV$_{0.3}$Ni$_{1.7}$ | 382 |
| 38 | ZrV$_{0.1}$Ni$_{2.4}$ | 269 |
| 39 | ZrV$_{0.01}$Ni$_{1.0}$ | 254 |
| 40 | ZrV$_{1.3}$Ni$_{2.4}$ | 218 |
| 41 | ZrNi$_2$ | 248 |
| 42 | ZrV$_{0.4}$Ni$_{0.5}$ | 245 |
| 43 | ZrV$_{0.4}$Ni$_{2.6}$ | 167 |

The alloy Nos. 33 to 39 are alloys of the invention and the alloy Nos. 40 to 43 consist of elements used in the present invention but the atomic ratios are outside scope of the invention or the Laves phase of the C14 or 15 type was not formed. More particularly, the alloy No. 40 has a larger atomic ratio of V and the alloy No. 41 does not form the C14 or 15 type structure. The alloy Nos. 42 and 43 have, respectively, a smaller nickel content and a larger nickel content. These alloys were used as a negative electrode for alkaline battery and evaluated with respect to the discharge capacity in the same manner as in Example 1.

Figure 4:
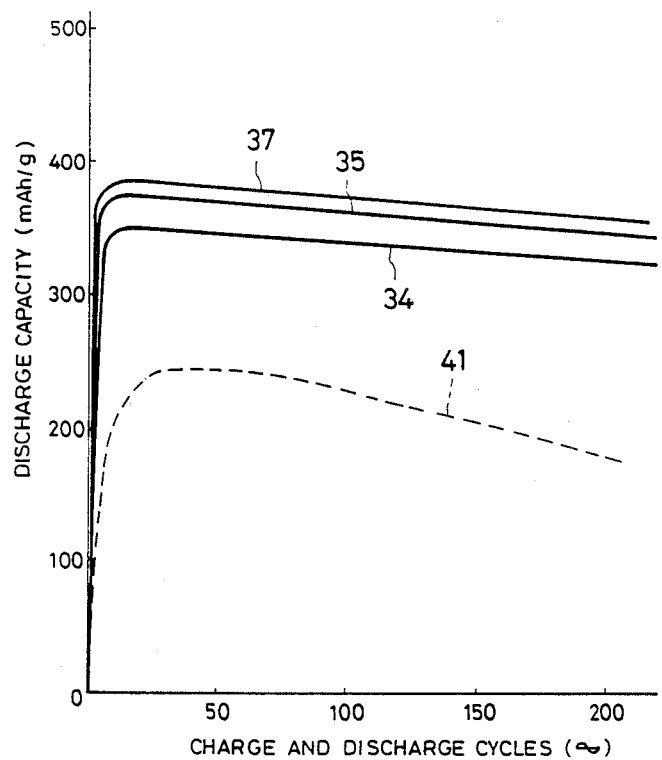
FIGS. 4 to 10 are, respectively, a graphical representation of a discharge capacity in relation to the variation in charge and discharge cycle for different hydrogen storage electrodes obtained according to embodiments of the invention.

The discharge capacity after 10 charge and discharge cycles is indicated in Table 1. The charge and discharge cycle life of the electrodes using the alloy Nos. 34, 35, 37 and 41 are shown in FIG. 4, in which the numeral references in the figure correspond to the alloy numbers, respectively. From these results, it will be seen that the negative electrodes using the alloys of this embodiment have a larger discharge capacity and a longer cycle life. The alloy No. 41 is outside the scope of the invention and is poorer in the life characteristic.

If the atomic ratio, b, is smaller than 0.01 or larger than 1.20, the discharge capacity becomes small. Moreover, when the atomic ratio, c, is smaller than 1.0 or larger than 2.5, the discharge capacity is small. This is because the content of V relates to charged ampere-hour, i.e. a larger content results in a larger charged ampere-hour characteristic but in the smaller discharge efficiency due to the formation of a stable, non-reversible hydride. The content of Ni is concerned with a charge and discharge cycle characteristic or durability, i.e. a larger content of Ni leads to a longer life with a tendency toward a smaller charged ampere-hour characteristic.

In view of the above results and also of the homogeneity and stability of the alloy phase, the alloy of the general formula, ZrV$_b$Ni$_c$, in which b=0.01 to 1.20 and c=1.0 to 2.5 is preferred. More preferably, b=0.1 to 0.6 and c=1.4 to 1.9. Within the more preferable range, the alloy electrode has a dischare ampere-hour of not less than 350 mAh/g at the 10th cycle and is good in economy.

EXAMPLE 3

This example illustrates a preferred alloy of the formula, ZrMo$_d$Ni$_e$, in which d=0.1 to 1.20 and e=1.1 to 2.5.

Substantially in the same manner as in Example 1, Zr-Mo-Ni alloy Nos. 44 to 53 having the compositions indicated in Table 3 were prepared. The alloy Nos. 44 to 49 are alloys of this embodiment and the alloy Nos. 50 to 53 consist of Zr-Mo-Ni but the atomic ratios are outside the scope of the invention or the type of alloy phase is not in conformity with the scope of the invention. The alloy No. 50 has a larger atomic ratio of Mo, the alloy Nos. 51 and 52 are not within the scope of the invention with respect to the alloy phase and have, respectively, a smaller atomic ratio of Mo and a smaller atomic ratio of Ni. The alloy No. 53 has a larger atomic ratio of Ni. These alloys were subjected to a performance test in which they were used as a negative electrode of alkaline battery.

The negative electride was fabricated by pulverizing each alloy into pieces having a size of 400 mesh or below. About 5 g of the pieces were mixed with a binder and a conductive agent in the same manner as in the foregoing examples.

The discharged ampere-hour of an open system at the 10th charge and discharge cycle is indicated in Table 3.

TABLE 3

| Alloy No. | Alloy Composition | Discharged Ampere-Hour After The 10th Cycle (mAh/g) |
|---|---|---|
| 44 | $ZrMo_{1.2}Ni_{2.5}$ | 258 |
| 45 | $ZrMo_{0.65}Ni_{1.8}$ | 343 |
| 46 | $ZrMo_{0.6}Ni_{1.9}$ | 367 |
| 47 | $ZrMo_{0.5}Ni_{1.4}$ | 359 |
| 48 | $ZrMo_{0.3}Ni_{1.7}$ | 376 |
| 49 | $ZrMo_{0.1}Ni_{2.5}$ | 258 |
| 50 | $ZrMo_{1.3}Ni_{2.4}$ | 210 |
| 51 | $ZrMo_{0.05}Ni_{1.4}$ | 239 |
| 52 | $ZrMo_{0.4}Ni_{1.0}$ | 234 |
| 53 | $ZrMo_{0.4}Ni_{2.6}$ | 155 |

Figure 5:
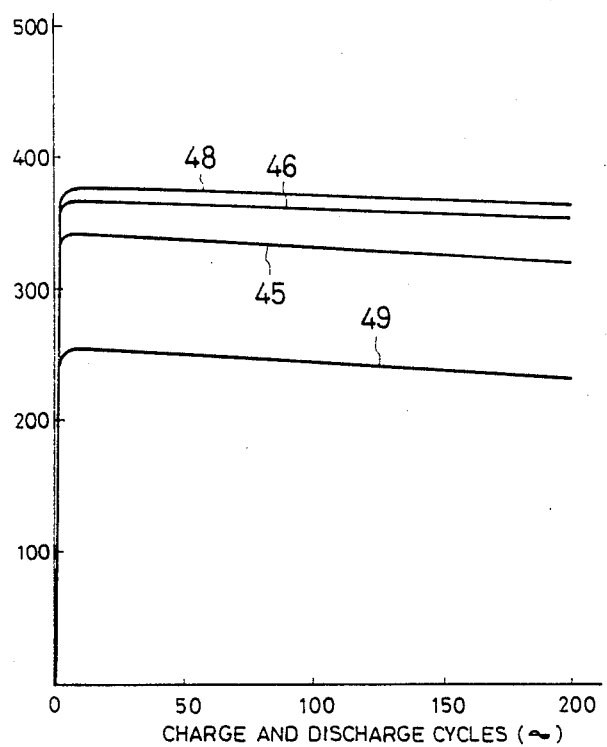

FIG. 5 shows a charge and discharge cycle life of the electrodes using the alloy Nos. 45, 46, 48 and 49. From the figure, the hydrogen storge alloy electrodes of the invention have a great discharge capacity and a good durability with a good initial discharge rise-up characteristic. This alloy system is better than other types of alloys with respect to an initial activation characteristic and rapid charge and discharge characteristics.

When the atomic ratio of Mo is smaller than 0.1 or larger than 1.2, the discharge capacity is small. On the other hand, when the atomic ratio of Ni is smaller than 1.1 or larger than 2.5, the discharge capacity is small. This is because the content of Mo takes part in the charged ampere-hour, i.e. a larger content of Mo results in a larger charged ampere-hour but because of the formation of a stable hydride, the discharge efficiency is so small that the discharged ampere-hour reduces. The content of Ni has such effects as discussed in Example 2.

EXAMPLE 4

This example illustrate hydrogen storage alloys of the general formula, $Zr_f V_g Ni_h M_i$, in which $f=0.5$ to 1.5, $g=0.01$ to 1.2, $h=0.4$ to 2.5, and $i=0.01$ to 1.8 provided that $g+h+i=1.2$ to 3.7 and $(g+h+i)/f=1.0$ to 2.5, and M is at least one element selected from Mg, Ca, Y, Hf, Nb, Ta, Cr, Mo, W, Mn, Fe, Co, Pd, Cu, Ag, Au, Zn, Cd, Al, Si, In, Sn, Bi, La, Ce, Mm, Pr, Nd, Th and Sm.

Substantially in the same manner as in the for foregoing examples, commercially available Zr, Ni, V, Mg, Ca, Hf, Nb, ta, Cr, Mo, W, Mn, Fe, Co, Pd, Cu, Ag, Au, Zn, Cd, Al, In, Sn, Bi, La, Ce, Mn, Pr, Nd, Th and Sm pieces were used to obtain alloys of the above general formula. The thus obtained alloys are shown in Table 4, in which the alloy Nos. 54 to 104, 109 and 110 are those of the invention and the alloy Nos. 105 to 108 are outside the scope of the invention with respect to the $(g+h+i)/f$ ratio. In addition, the alloy No. 105 has a larger atomic ratio of V than the define value, the alloy No. 106 is small atomic ratio of Zr. Likewise, the alloy No. 107 had a smaller atomic ratio of Ni and the alloy No. 108 has a larger atomic ratio of M. These alloys were, respectively, subjected to the evaluation test of the performance as a negative electrode of alkaline storage battery. The negative electrode was made by reducing each alloy obtained by an argon arc melting method into pieces having a size of 400 mesh or below, followed by repeating the procedure described in the foregoing examples. The alloys compositions and the discharged ampere-hour of an open system using each electrode at the 10th charge and discharge cycle are shown in Table 4 below. Moreover, the charge and discharge cycle life of several alloy electrodes in shown in FIG. 6.

TABLE 4

| Alloy No. | Alloy Composition | Discharged Ampere-Hour at the 10th Cycle (mAh/g) |
|---|---|---|
| 54 | $ZrV_{0.5}Ni_{1.0}Co_{0.5}$ | 366 |
| 55 | $ZrV_{0.4}Ni_{1.1}Co_{0.3}$ | 359 |
| 56 | $Zr_{1.1}V_{0.3}Ni_{0.2}$ | 375 |
| 57 | $ZrV_{0.3}Ni_{1.5}Co_{0.2}$ | 363 |
| 58 | $ZrV_{0.4}Ni_{1.4}Co_{0.3}$ | 372 |
| 59 | $Zr_{1.1}V_{0.5}Ni_{1.3}Co_{0.4}$ | 371 |
| 60 | $ZrV_{0.2}Ni_{1.4}Fe_{0.4}$ | 346 |
| 61 | $ZrV_{0.3}Ni_{1.3}Fe_{0.2}$ | 355 |
| 62 | $Zr_{1.2}V_{0.6}Ni_{1.2}Fe_{0.2}$ | 344 |
| 63 | $Zr_{0.9}V_{0.5}Ni_{1.2}Fe_{0.5}$ | 328 |
| 64 | $ZrV_{0.4}Ni_{1.3}Mn_{0.3}$ | 349 |
| 65 | $ZrV_{0.1}Ni_{1.6}Mn_{0.4}$ | 271 |
| 66 | $Zr_{1.1}V_{0.7}Ni_2Mn_{0.5}$ | 316 |
| 67 | $ZrV_{0.6}Ni_{0.8}Cu_{0.6}$ | 299 |
| 68 | $Zr_{0.8}V_{0.4}Ni_{1.0}Cu_{0.5}$ | 370 |
| 69 | $Zr_{1.2}V_{1.2}Ni_{0.4}Cu_{0.01}$ | 303 |
| 70 | $ZrV_{0.7}Ni_{1.0}La_{0.3}$ | 357 |
| 71 | $ZrV_{0.5}Ni_{1.4}Ce_{0.1}$ | 348 |
| 72 | $ZrV_{0.4}Ni_{1.4}Mn_{0.2}$ | 336 |
| 73 | $ZrV_{0.4}Ni_{1.5}Mg_{0.1}$ | 362 |
| 74 | $ZrV_{0.4}Ni_{1.5}Ca_{0.1}$ | 358 |
| 75 | $ZrV_{0.4}Ni_{1.4}Y_{0.2}$ | 352 |
| 76 | $ZrV_{0.4}Ni_{1.4}Nb_{0.2}$ | 342 |
| 77 | $Zr_{0.9}V_{0.3}Ni_{1.7}Hf_{0.2}$ | 297 |
| 78 | $ZrV_{0.4}Ni_{1.4}Ta_{0.2}$ | 288 |
| 79 | $ZrV_{0.4}Ni_{1.4}Mo_{0.2}$ | 292 |
| 80 | $ZrV_{0.4}Ni_{1.4}Ti_{0.2}$ | 307 |
| 81 | $ZrV_{0.4}Ni_{1.4}W_{0.2}$ | 312 |
| 82 | $ZrV_{0.4}Ni_{1.5}Pd_{0.1}$ | 340 |
| 83 | $ZrV_{0.4}Ni_{1.5}Ag_{0.1}$ | 275 |
| 84 | $ZrV_{0.4}Ni_{1.5}Ag_{0.1}$ | 304 |
| 85 | $ZrV_{0.4}Ni_{1.5}Zn_{0.1}$ | 314 |
| 86 | $ZrV_{0.4}Ni_{1.5}Cd_{0.1}$ | 289 |
| 87 | $ZrV_{0.4}Ni_{1.5}Al_{0.1}$ | 322 |
| 88 | $ZrV_{0.4}Ni_{1.5}In_{0.1}$ | 288 |
| 89 | $ZrV_{0.4}Ni_{1.5}Si_{0.1}$ | 324 |
| 90 | $ZrV_{0.4}Ni_{1.5}Sn_{0.1}$ | 292 |
| 91 | $ZrV_{0.4}Ni_{1.5}Bi_{0.1}$ | 314 |
| 92 | $ZrV_{0.4}Ni_{1.5}Pr_{0.1}$ | 351 |
| 93 | $ZrV_{0.4}Ni_{1.5}Nd_{0.1}$ | 348 |
| 94 | $ZrV_{0.4}Ni_{1.5}Th_{0.1}$ | 362 |
| 95 | $ZrV_{0.4}Ni_{1.0}Co_{0.3}Cu_{0.3}$ | 360 |
| 96 | $ZrV_{0.4}Ni_{1.0}Fe_{0.3}Mn_{0.3}$ | 358 |
| 97 | $ZrV_{0.3}Ni_{1.1}Cr_{0.2}Co_{0.4}$ | 378 |
| 98 | $ZrV_{0.2}Ni_{1.5}Mn_{0.2}Co_{0.4}$ | 344 |
| 99 | $ZrV_{0.2}Ni_{1.3}Ce_{0.1}Co_{0.1}Fe_{0.2}$ | 338 |
| 100 | $Zr_{1.5}V_{0.4}Ni_{1.6}Hf_{0.4}Ti_{0.3}$ | 281 |
| 101 | $Zr_{0.7}V_{0.01}Ni_{0.4}Cr_{0.8}$ | 255 |
| 102 | $Zr_{1.5}V_{5.2}Ni_{2.3}Cu_{0.1}$ | 304 |
| 103 | $Zr_{1.4}V_{1.0}Ni_{2.4}Co_{0.01}$ | 272 |
| 104 | $Zr_{1.1}V_{0.05}Ni_{0.7}Sn_{1.8}$ | 268 |
| 105 | $ZrV_{1.3}Ni_{0.9}Mn_{1.5}$ | 197 |
| 106 | $Zr_{0.4}V_{0.3}Co_{0.5}$ | 144 |
| 107 | $Zr_{0.6}V_{0.5}Ni_{0.3}Fe_{1.0}$ | 213 |
| 108 | $ZrV_{0.5}Ni_{1.3}Cr_{1.9}$ | 206 |
| 109 | $ZrV_{0.2}Ni_{1.4}Mnhd\ 0.2Cr_{0.2}$ | 268 |
| 110 | $ZrV_{0.3}Ni_{1.5}Mn_{0.1}Fe_{0.1}$ | 277 |

Figure 6:
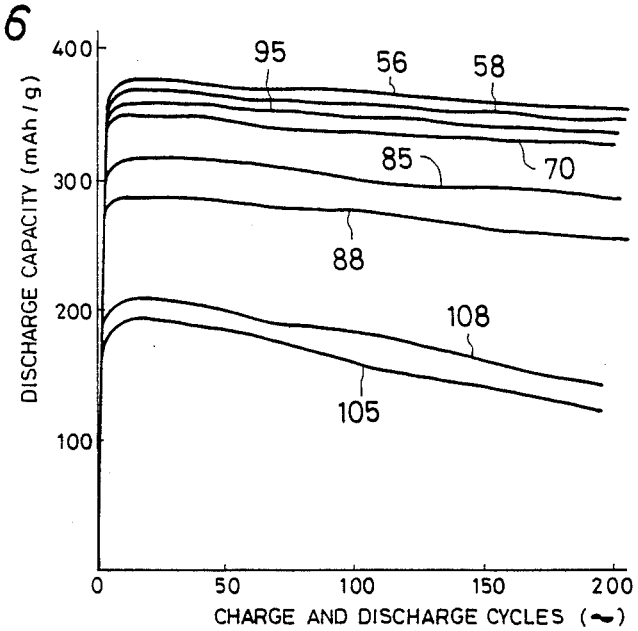
Figure 7:
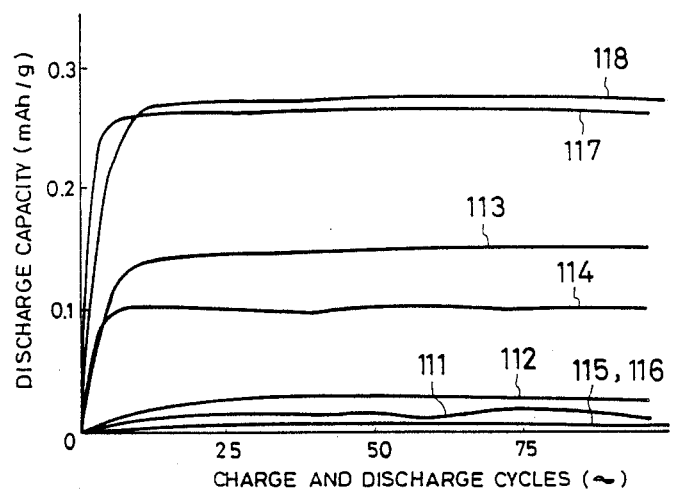
Figure 8:
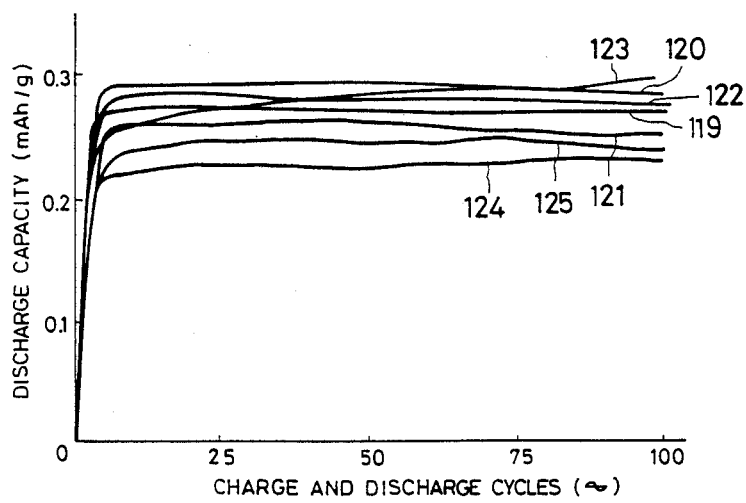
Figure 9:
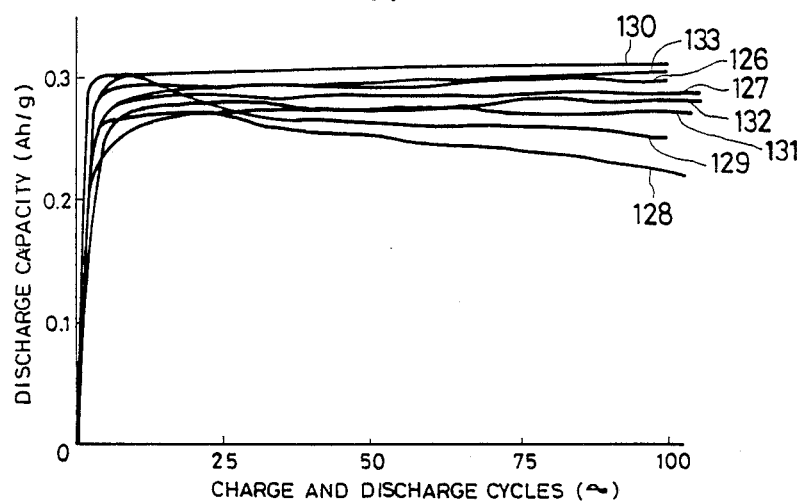
Figure 10:
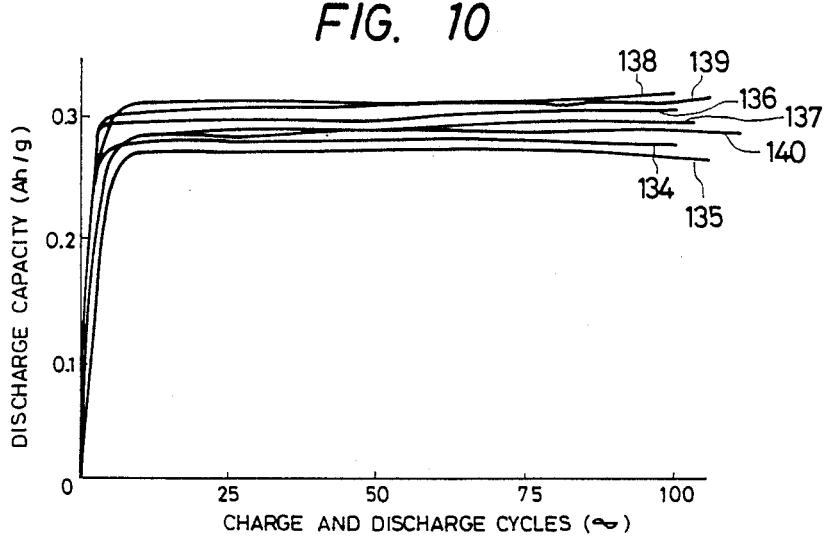

As will be apparent from the results of Table 4 and FIG. 6, the hydrogen storage alloy electrodes of the invention have a large discharge capacity with the good cycle life and initial discharge rise-up characteristic. It was also found that the rapid charge and discharge characteristic was good.

Although not particularly shown, when the content of V is smaller than 0.01 or larger than 1.2, the resultant alloys exhibit a small discharge capacity. With the alloys in which the content of an additive element is smaller than 0.01 or larger than 1.8, the discharge capacity is small. Moreover, when the content of Zr is smaller than 0.5, the charge capacity is insufficient.

Over 1.5, the discharge capacity is small. When the content of Ni is smaller than 0.4, the cycle life is not satisfactory. Over 2.5, the charge capacity is small. In addition, when the contents of V, Ni and M, i.e. g+h+i, is smaller than 1.2, the resultant alloys has a small discharge capacity. Over 3.7, the charge capacity is small. More particularly, the contents of Zr and V have the relation with the charged ampere-hour, in which larger contents of Zr and V result in a larger charged ampere-hour but lead to a greater tendency toward the formation of a stable hydride, thus leading to a smaller discharge rate. The effect of Ni in this type of alloy is similar to those alloys described in the foregoing examples. The content of the additive element, M, is considered to take part in the charge and discharge cycle characteristic and the discharge potential. A larger content of M results in a more improved charge and discharge cycle characteristic and discharge potential, with a decrease of a charged ampere-hour. Judging the above as a whole, the ratio of the contents of V+Ni+M to the content of Zr should be in the range of from 1.0 to 2.5.

The results of the table reveal that preferred ranges of V and an additive element are, respectively, from 0.2 to 0.7 to 0.2 to 0.8. Within these ranges, the discharged ampere-hour is over 280 mAh/g. In addition, a high capacity and a long cycle life are ensured with good economy.

For the preparation of the alloy Nos. 60 to 63, and Nos. 99 and 110 of the Table 4, starting materials for the hydrogen storage alloys were ferrovanadium. The use of the ferrovanadium was found to be better with respect to the homogeneity of the resultant alloy than the use of separate Fe and V elements, and contributed to a simpler fabrication process with remarkably reduced production costs.

EXAMPLE 5

This example illustrates electrodes of alloys of the general formula, $A'B'_4Ni_5$, in which A represents Zr, or a mixture of at least 30 atomic percent of Zr and the balance of at least one element selected from the group consiting of Ti, Hf, Al and Si, B represents at least one element selected from V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm where Mm is a mixture of rare earth elements, and j=0.5 to 1.0 and k=1.0 to 1.5 provided that j+k=1.5 to 2.5. The alloys prepared are shown in Table 5 in which the alloy Nos. 111 to 116 are for comparison. The alloy Nos. 111 to 114 do not form the Laves phase. The alloy Nos. 115 and 116 form the Laves phase but are so small in crystal lattice constant that hydrogen is rarely absorbed.

The alloy Nos. 117 to 140 are alloys of the above general formula and were found to consist of the C14 or C15 type Laves phase. With the C15 type crystal structure, the crystal lattice constant was in the range of 6.92 to 7.70 angstroms. The C14 type structure was found to have crystal lattice constants, a and c, of 4.8 to 5.2 angstroms and 7.9 to 8.2 angstroms, respectively. These alloys were subjected to measurement of the P-C-T characteristic using hydrogen gas, with the result that an amount of stored hydrogen was relatively high.

TABLE 5

| Alloy No. | Alloy Composition |
|---|---|
| 111 | $Zr_2Ni$ |
| 112 | $ZrNi$ |
| 113 | $ZrNi_2$ |
| 114 | $ZrNi_3$ |
| 115 | $ZrMn_{0.5}Cr_{1.5}$ |
| 116 | $ZrMn_{1.0}Fe_{1.0}$ |
| 117 | $ZrNb_{0.5}Ni_{1.5}$ |
| 118 | $ZrCr_{0.5}Ni_{1.5}$ |
| 119 | $ZrMo_{0.5}Ni_{1.5}$ |
| 120 | $ZrMn_{0.6}Ni_{1.4}$ |
| 121 | $ZrFe_{0.8}Ni_{1.2}$ |
| 122 | $ZrCo_{0.8}Ni_{1.2}$ |
| 123 | $ZrCu_{0.5}Ni_{1.5}$ |
| 124 | $ZrAl_{0.5}Ni_{1.5}$ |
| 125 | $ZrMm_{0.5}Ni_{1.5}$ |
| 126 | $Zr_{0.9}Ti_{0.1}Mn_{0.5}Ni_{1.5}$ |
| 127 | $Zr_{0.8}Hf_{0.2}Mn_{0.8}Ni_{1.2}$ |
| 128 | $ZrMn_{0.8}Ni_{1.5}$ |
| 129 | $ZrMn_{0.8}Ni_{1.0}$ |
| 130 | $ZrMn_{0.6}Cr_{0.4}Ni_{1.3}$ |
| 131 | $ZrMn_{0.5}Cr_{0.3}Ni_{1.2}$ |
| 132 | $ZrMn_{0.8}Cr_{0.1}Ni_{1.1}$ |
| 133 | $ZrMn_{0.6}Co_{0.2}Ni_{1.2}$ |
| 134 | $ZrCr_{0.4}Co_{0.3}Ni_{1.3}$ |
| 135 | $ZrMn_{0.4}Cu_{0.3}Ni_{1.3}$ |
| 136 | $ZrMn_{0.5}Al_{0.1}Ni_{1.4}$ |
| 137 | $Zr_{0.9}Ti_{0.1}Mn_{0.5}Fe_{0.3}Ni_{1.2}$ |
| 138 | $ZrMn_{0.5}Cr_{0.2}Co_{0.2}Ni_{1.1}$ |
| 139 | $ZrMn_{0.5}Cr_{0.2}Al_{0.1}Ni_{1.2}$ |
| 140 | $ZrMn_{0.5}Co_{0.3}Fe_{0.2}Ni_{1.1}$ |

These alloys were used to made a cell test in an alkaline electrolytic solution in the same manner as in the foregoing examples. The results are shown in FIG. 7 through 10 in which the numerals in the figures correspond to the alloy numbers, respectively.

From the results of the figures, although the alloy Nos. 111 and 112 have a great amount of stored hyrogen, but an electrochemical release amount is very small. Since the alloy No. 114 has an excessive amount of Ni, the amount of stored hydrogen lowers and thus, a satisfactory discharge capacity cannot be obtained. With the alloy Nos. 115 and 116, the Laves phase is formed but the crystal lattice constant is so small that the discharge capacity is very small. In contrast, the alloy Nos. 117 to 140 of this embodiment keep a high discharge capacity of 250 to 350 mAh/g after repetition of the charge and discharge cycle and are thus excellent as a hydrogen storage electrode.

Subsequently, the hydrogen storage alloy electrodes were used to make a cylindrical sealed nickel-hydrogen secondary cell of the UM 2 type for evaluation. The alloys used were those alloys of Nos. 131, 133, 136 and 138. These alloys were each reduced into pieces having a size not larger than 150 mesh (U.S. standard), to which a polyvinyl alcohol binder was added along with water to make a paste. The paste was applied to a nickel-plated punching metal sheet and dried, followed by cutting it to an elongated piece having a width of 3.9 cm and a length of 26 cm. Lead sheets were attached to the piece in position by spot welding to obtain a hydrogen storage alloy electrode. A counter electrode used was a known foamed nickel electrode having a width of 3.9 cm and a length of 22 cm. A separator was a polyamide non-woven fabric, and an electrolytic solution used was a solution of 20 g/liter of lithium hydroxide in a potassium hydroxide aqueous solution having a specific gravity of 1.20. A nominal capacity was 3.0 Ah.

Figure 11:
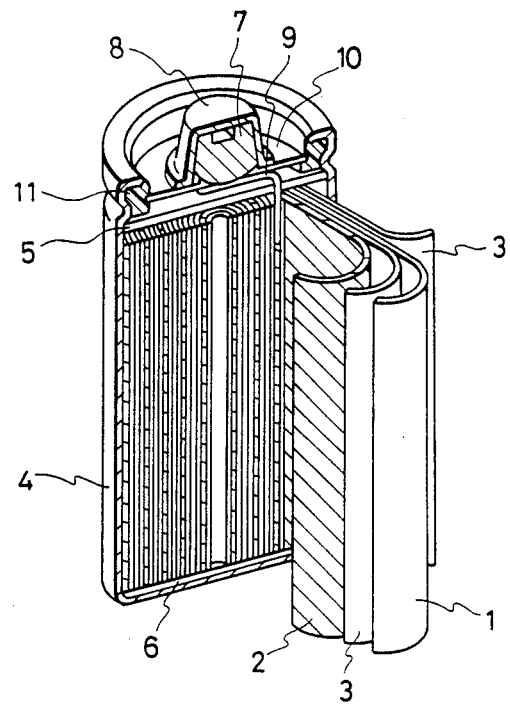
FIG. 11 is a schematic perspective view, in section, of a sealed cell using hydrogen storage electrodes of the invention.

FIG. 11 shows a schematic view of the secondary cell of the cylindrical form which includes a hydrogen storage alloy negative electrode 1, a nickel positive electrode 2 and a separator 3 provided between the electrodes 1 and 2. Indicated by 4 is a case serving also as a terminal for the negative electrode, by 5 and 6 are insulator plates, and by 7 is a safety valve. Indicated by 8 is a terminal for the positive electrode, by 9 is a positive lead, by 10 is a sealing plate, and by 11 is an insulating gasket.

The cells were each subjected to a charge and discharge cycle test at 20° C. The charging was effected at 0.1 C or 10 hour rates to a level of 130% and the discharging was effected at 0.2 C or 5 hour rates to a final voltage of 1.0 volt. This charge and discharge cycle was repeated. As a result, it was found that the cells using the alloys of the invention kept a discharge capacity of approximately 3.0 Ah after repetition of 200 cycles, without any lowering of the performance. These results demonstrate that the alloys of the invention are appropriately applicable to sealed cells or batteries as shown in FIG. 11.

EXAMPLE 6

Similar to Example 5, there were prepared alloys of the general formula, $AB_lNi_m$, in which A represents a mixture of at least 30 atomic percent of Zr and the balance of Al or Si, B represents at least one elements selected from V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm, $l=0.5$ to 1.0 and $m=1.0$ to 1.5 provided that $l+m=1.0$ to 2.5. The alloy compositions are indicated in Table 6. The alloy Nos. 141 to 162 were of the above general formula and were found to have a C14 or C15 type Laves phase. With the 15 type Laves phase alloy, the crystal lattice constant was in the range of from 6.92 to 7.70 angstroms for all the alloys. Further, the C14 type Laves phase was found to have crystal lattice constants a and b within the ranges of from 4.8 to 5.2 angstroms and from 7.9 to 8.3 angstroms, respectively. When subjected to measurement of the ordinary P-C-T characteristic using hydrogen gas, the alloys had a relatively great amount of stored hydrogen.

TABLE 6

| Alloy No. | Alloy Composition |
|---|---|
| 141 | $Zr_{0.8}Al_{0.2}Nb_{0.6}Ni_{1.2}$ |
| 142 | $Zr_{0.9}Al_{0.1}Cr_{0.8}Ni_{1.2}$ |
| 143 | $Zr_{0.9}Al_{0.1}Mo_{0.8}Ni_{1.2}$ |
| 144 | $Zr_{0.9}Al_{0.1}Mn_{0.8}Ni_{1.2}$ |
| 145 | $Zr_{0.9}Al_{0.1}Fe_{0.8}Ni_{1.2}$ |
| 146 | $Zr_{0.9}Al_{0.1}Co_{0.8}Ni_{1.2}$ |
| 147 | $Zr_{0.9}Al_{0.1}Co_{0.8}Ni_{1.2}$ |
| 148 | $Zr_{0.9}Al_{0.1}Mm_{0.8}Ni_{1.2}$ |
| 149 | $Zr_{0.7}Al_{0.3}Mn_{0.8}Ni_{1.2}$ |
| 150 | $Zr_{0.7}Si_{0.3}Mn_{0.8}Ni_{1.2}$ |
| 151 | $Zr_{0.8}Al_{0.2}Mn_{0.5}Ni_{1.2}$ |
| 152 | $Zr_{0.8}Al_{0.2}Mn_{1.0}Ni_{1.2}$ |
| 153 | $Zr_{0.8}Al_{0.2}Mn_{0.8}Ni_{1.0}$ |
| 154 | $Zr_{0.8}Al_{0.2}Mn_{0.8}Ni_{1.5}$ |
| 155 | $Zr_{0.9}Al_{0.1}Mn_{0.5}Cr_{0.3}Ni_{1.2}$ |
| 156 | $Zr_{0.9}Al_{0.1}Mn_{0.6}Co_{0.2}Ni_{1.2}$ |
| 157 | $Zr_{0.9}Al_{0.1}Cr_{0.4}Co_{0.3}Ni_{1.3}$ |
| 158 | $Zr_{0.9}Al_{0.1}Mn_{0.4}Cu_{0.3}Ni_{1.3}$ |
| 159 | $Zr_{0.9}Al_{0.1}Mn_{0.6}Cr_{0.4}Ni_{1.3}$ |
| 160 | $Zr_{0.9}Al_{0.1}Mn_{0.4}V_{0.2}Ni_{1.4}$ |
| 161 | $Zr_{0.9}Si_{0.1}Mn_{0.8}Cr_{0.1}Ni_{1.1}$ |
| 162 | $Zr_{0.9}Si_{0.1}Mn_{0.5}Fe_{0.3}Ni_{1.2}$ |

Figure 12:
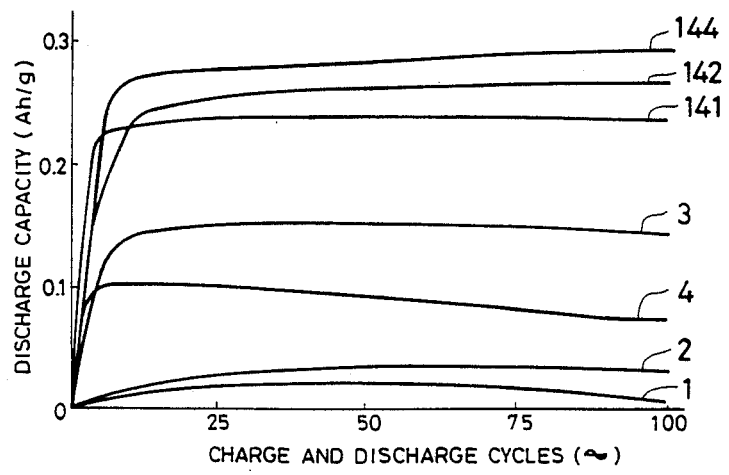

The alloys were subsequently subjected to a cell test in an alkaline electrolytic solution in the same manner as in the foregoing examples. The results are shown in FIGS. 12 to 14 in which the numerals correspond to the alloy numbers, respectively.

These results demonstrate that the alloys of this example exhibit a discharge capacity of from 250 to 300 mAh/g after the charge and discharge cycle has been repeated and are thus excellent as a hydrogen storage electrode.

Moreover, when the alloys were used to make a cylindrical sealed nickel-hydrogen secondary cell having such a construction as shown in FIG. 11 and evaluated, it was found that the cells using the hydrogen storage alloy electrodes of the invention kept a discharge capacity of approximately 3.0 Ah after repetition of 200 cycles or over.

The alloys of this example are more advantageous than those of the foregoing examples in that since Al and Si is used by substitution for part of Zr, strong chemical activities such as ignitable properties of Zr-based alloys can be mitigated. Thus, these Al or Si-substituted alloys are more convenient in handling.

What is claimed is:

1. A hydrogen storage electrode comprises a body of an alloy of the general formula, $AB_a$, or a hydride thereof, in which A represents Zr or a mixture of at least 30 atomic percent Zr and the balance of at least one element selected from the group consisting of Ti, Hf, Al and Si, B represents a mixture of at least 40 atomic percent Ni and a balance of at least one element selected from the group consisting of V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm where Mm is a mixture of rare earth elements, Pr, Nd, Th and Sm provided that A and B are different from each other, and a is a value of from 1.0 to 2.5, said alloy being substantially a Laves phase of an intermetallic compound of A and B, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

2. A hydrogen storage electrode according to claim 1, wherein said body is made of said alloy.

3. A hydrogen storage electrode according to claim 1, wherein said body is made of said hydride.

4. A hydrogen storage electrode comprises a body of an alloy of the general formula, $AB_a$, or a hydride thereof, in which A represents Zr or a mixture of at least 30 atomic percent Zr and the balance of at least one element selected from the group consisting of Ti, Hf, Al and Si, B represents Ni or a mixture of at least 40 atomic percent Ni and a balance of at least one element selected from the group consisting of V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm where Mm is a mixture of rare earth elements, Pr, Nd, Th and Sm provided that A and B are different from each other, and a is a value of from 1.0 to 2.5, said alloy being substantially a Laves phase of an intermetallic compound of A and B, and having a crystal structure of a cubic symmetric C15 type having a crystal lattice constant of from 6.92 to 7.70 angstroms.

5. A hydrogen storage electrode comprises a body of an alloy of the general formula, $AB_a$, or a hydride thereof, in which A represents Zr or a mixture of at least 30 atomic percent Zr and the balance of at least one element selected from the group consisting of Ti, Hf, Al and Si, B represents Ni or a mixture of at least 40 atomic percent Ni and a balance of at least one element selected from the group consisting of V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm where Mm is a mixture of rare earth elements, Pr, Nd, Th and Sm provided that A and B are different from each other, and a is a value of from 1.0 to 2.5, said alloy being substantially a Laves phase of an intermetallic compound of A and B, and having a crystal structure of a hexagonal symmetric C14 type having crystal lattice constants, a and c, of from 4.8 to 5.2 angstroms and from 7.9 to 8.3 angstroms, respectively.

6. A hydrogen storage electrode comprises a body of an alloy of the general formula $ZrV_dNi_e$, in which $d=0.01$ to 1.20, $e=1.0$ to 2.5, and $e/(d+e)$ is not less than 0.4, said alloy having an alloy phase which is substantially a Laves phase of an intermetallic compound of Zr, V and Ni, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

7. A hydrogen storage electrode according to claim 6, wherein $b=0.1$ to 0.6 and $c=1.4$ to 1.9.

8. A hydrogen storage electrode comprises a body of an alloy of the general formula $ZrMo_dNi_e$, in which $d=0.1$ to 1.20, $e=1.1$ to 2.5, and $e/(d+e)$ is not less than 0.4, said alloy having an alloy phase which is substantially a Laves phase of an intermetallic compound of Zr, Mo and Ni, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

9. A hydrogen storage electrode according to claim 8, wherein $d=0.3$ to 0.7 and $e=1.4$ to 1.9.

10. A hydrogen storage electrode comprises a body of an alloy of the general formula $Zr_fV_gNi_hM_i$, in which f, g, h and i are atomic ratios of Zr, V, Ni and M and $f=0.5$ to 1.5, $g=0.01$ to 1.2, $h=0.4$ to 2.5, $i=0.01$ to 1.8, $g+h+i=1.2$ to 3.7, $(g+h+i)/g=1.0$ to 2.5, and $h/(g+h+i)$ is not less than 0.4, and M is at least one element selected from Mg, Ca, Y, Hf, Nb, Ta, Cr, Mo, W, Mn, Fe, Co, Pd, Cu, Ag, Au, Zn, Cd, Al, Si, In, Sn, Bi, La, Ce, Mm, Pr, Nd, Th and Sm, wherein Mm is a mixture of rare earth elements, said alloy having an alloy phase which is substantially a Laves phase of an intermetallic compound of Zr, V, Ni and M, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

11. A hydrogen storage electrode according to claim 10, wherein said alloy contains at least Fe as M.

12. A hydrogen storage electrode according to claim 10, wherein said alloy contains at least Mn as M.

13. A hydrogen storage electrode according to claim 10, wherein $g=0.2$ to 0.7, and $i=0.2$ to 0.8.

14. A hydrogen storage electrode comprises a body of an alloy of the general formula $AB_jNi_k$, in which A represents Zr or a mixture of at least 30 atomic percent Zr and the balance of at least one element selected from Ti, Hf, Al and Si, B represents at least one element selected from V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm, wherein Mm is a mixture of rare earth elements, $j=0.5$ to 1.0, $k=0.5$ to 1.5, $j+k=0.1$ to 2.5, and $k/(j+k)$ is not less than 0.4, said alloy having an alloy phase which is substantially a Laves phase of an intermetallic compound of A, B and Ni, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

15. A hydrogen storage electrode according to claim 14, wherein B' represents two or more elements selected from the group consisting of Cr, Mn, Fe and Co.

16. A hydrogen storage electrode according to claim 14, wherein A' is Zr.

17. A hydrogen storage electrode according to claim 14, wherein A' is a mixture of Zr and Al or Si.

18. A hydrogen storage electrode comprises a body of an alloy of the general formula $ZrMn_nCr_oNi_p$, in which $n=0.4$ to 0.8, $o=0.1$ to 0.4, $p=0.5$ to 1.5, $n+o+p=1.0$ to 2.5, and $p/(n+o+p)$ is not less than 0.4, said alloy having an alloy phase which is substantially a Laves phase of an intermetallic compound of Zr, Mn, Cr and Ni, and having a crystal structure of a hexagonal symmetric C14 type having crystal lattice constants, a and c, of from 4.8 to 5.2 angstroms and from 7.9 to 8.3 angstroms, respectively, and/or a cubic symmetric C15 type having a crystal lattice constant of from 6.92 to 7.70 angstroms.

* * * * *